(12) United States Patent
Penner

(10) Patent No.: US 7,604,278 B2
(45) Date of Patent: Oct. 20, 2009

(54) SUPPORTS FOR VEHICLE INSTRUMENT PANELS

(75) Inventor: Benjamin Warren Penner, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 10 days.

(21) Appl. No.: 11/971,279

(22) Filed: Jan. 9, 2008

(65) Prior Publication Data

US 2009/0174216 A1 Jul. 9, 2009

(51) Int. Cl.
*B62D 25/14* (2006.01)

(52) U.S. Cl. .......................................... 296/72; 180/90

(58) Field of Classification Search ............... 296/70, 296/72, 193.02, 180.9; 248/27.1, 27.3; 180/90
See application file for complete search history.

(56) References Cited

U.S. PATENT DOCUMENTS

| | | | |
|---|---|---|---|
| 5,311,960 A | 5/1994 | Kukainis et al. | |
| 5,516,145 A | 5/1996 | Williams et al. | |
| 5,584,509 A | 12/1996 | Tekelly et al. | |
| 6,305,733 B1 * | 10/2001 | Rahmstorf et al. | 296/70 |
| 6,464,280 B1 * | 10/2002 | Shibata et al. | 296/70 |
| 6,685,259 B1 * | 2/2004 | Shimase et al. | 296/203.02 |
| 6,932,410 B2 | 8/2005 | DeLong et al. | |
| 6,988,764 B2 | 1/2006 | Matsutani | |
| 7,096,818 B2 * | 8/2006 | Kalil | 114/364 |
| 7,401,835 B2 * | 7/2008 | Gresham et al. | 296/70 |
| 2002/0003354 A1 * | 1/2002 | Inoue et al. | 296/70 |
| 2002/0050726 A1 | 5/2002 | Okana et al. | |
| 2002/0084667 A1 * | 7/2002 | Sutou et al. | 296/70 |
| 2004/0056463 A1 | 3/2004 | Marks et al. | |
| 2005/0140161 A1 | 6/2005 | DeLong et al. | |
| 2005/0264040 A1 | 12/2005 | Bailey et al. | |
| 2006/0283643 A1 | 12/2006 | Simonds et al. | |

\* cited by examiner

*Primary Examiner*—Dennis H Pedder
*Assistant Examiner*—Pinel E Romain
(74) *Attorney, Agent, or Firm*—Dinsmore & Shohl LLP

(57) ABSTRACT

An instrument panel for a vehicle having an instrument panel support configured to be supportive in the vertical direction. The instrument panel support is inserted into a receptacle contained on the underside of the instrument panel such that the receptacle holds the support part in the vertical and lateral directions. The instrument panel support is then affixed to the instrument panel by a fastener. Loads applied to the instrument panel are transferred to the instrument panel support which, in turn, transfers the load to an instrument panel reinforcement thereby improving the rigidity of the instrument panel.

18 Claims, 8 Drawing Sheets

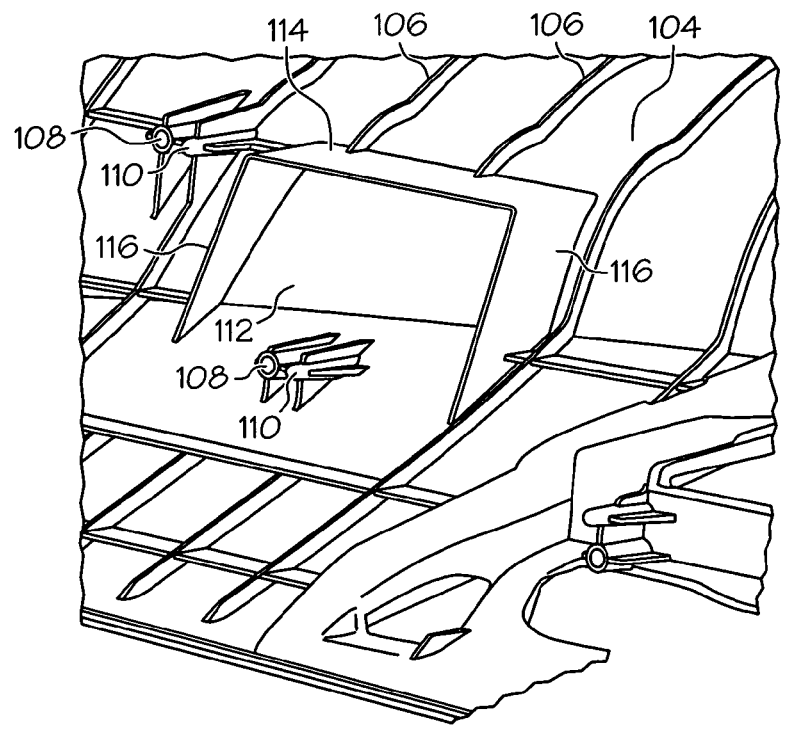
FIG. 1C
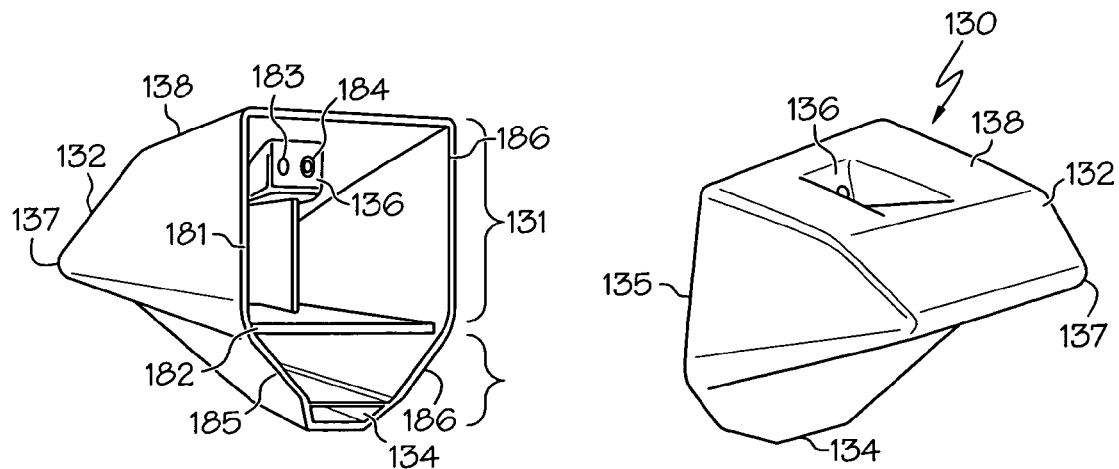
FIG. 2A
FIG. 2B

SUPPORTS FOR VEHICLE INSTRUMENT PANELS

TECHNICAL FIELD OF THE INVENTION

The present invention generally relates to vehicle instrument panels and, more specifically, to supports for vehicle instrument panels.

BACKGROUND

Vehicles may contain instrument panels located in front of the driver's and passenger's seats. The instrument panels may support various accessories and components including, gages, meters, audio components, video components, navigation accessories and the like. Some instrument panels may be made from polypropylene due to the low cost and recycleability of the material. However, instrument panels constructed of polypropylene may have less rigidity under an applied load compared to instrument panels constructed of other, more expensive materials such as ABS (acrylonitrile butadiene styrene) or similar materials commonly used to construct instrument panels. As such, instrument panels constructed of polypropylene are generally unable to support the same loads as instrument panels constructed of ABS or other materials. Further, instrument panels constructed from polypropylene may sag as a result of heat, aging or a combination of both effects. The size of an instrument panel may also affect the rigidity of the instrument panel. For example, vehicles with a highly raked windshield are wider from front to back and, therefore, are generally less rigid in this direction.

Accordingly, a need exists for an instrument panel support and a method of supporting an instrument panel to improve ridgity and prevent sagging due to heat and/or aging.

SUMMARY OF THE INVENTION

According to one embodiment, an instrument panel for a vehicle may include a top surface and an underside. The underside may have at least one receptacle for receiving an instrument panel support. The receptacle may be defined by at least one rib extending from the underside of the instrument panel and at least a portion of the underside of the instrument panel. The instrument panel may also include at least one instrument panel support configured to support the instrument panel in the vertical direction. The instrument panel support may include an upper contact surface, a lower contact surface, and at least one sidewall connecting the upper contact surface and the lower contact surface. The instrument panel support may be positioned in the receptacle such that the upper contact surface is in direct contact with the underside of the instrument panel.

In another embodiment, an instrument panel module for a vehicle may include an instrument panel and an instrument panel reinforcement. The instrument panel may include a top surface and an underside. The underside may have at least one receptacle for receiving an instrument panel support. The receptacle may be defined by at least one rib extending from the underside of the instrument panel and at least a portion of the underside of the instrument panel. The instrument panel may also include at least one instrument panel support configured to support the instrument panel in the vertical direction. The instrument panel support may include an upper contact surface, a lower contact surface, and at least one sidewall connecting the upper contact surface and the lower contact surface. The instrument panel support may be positioned in the receptacle such that the upper contact surface is in direct contact with the underside of the instrument panel. The instrument panel reinforcement may include a plurality of support brackets. To construct the instrument panel module, the instrument panel may be assembled on to the instrument panel reinforcement such that the instrument panel support is disposed between the instrument panel and the instrument panel reinforcement. The lower contact surface of the instrument panel support rests on at least a portion of the instrument panel reinforcement.

In another embodiment, a method of assembling a vehicle instrument panel module may include providing a vehicle instrument panel, providing a vehicle instrument panel support, and providing a vehicle instrument panel reinforcement. The vehicle instrument panel may be inserted into a receptacle located on the underside of the instrument panel. The instrument panel may then be positioned on the instrument panel reinforcement such that the instrument panel support is disposed between the instrument panel and the instrument panel reinforcement. The lower contact surface of the instrument panel support rest on a portion of the instrument panel reinforcement such that, when vertical loads are applied to the instrument panel, the loads are transferred from the instrument panel to the instrument panel reinforcement via the instrument panel support.

BRIEF DESCRIPTION OF THE DRAWINGS

The following description of the specific illustrated embodiments can be read in conjunction with the following drawings in which:

FIG. 1C is a close up view of a receptacle for receiving an instrument panel support in accordance with one embodiment of the present invention;

FIGS. 2A and 2B are front and back perspective views of an instrument panel support in accordance with one embodiment of the present invention;

DETAILED DESCRIPTION OF THE ILLUSTRATED EMBODIMENTS

Figure 1A:
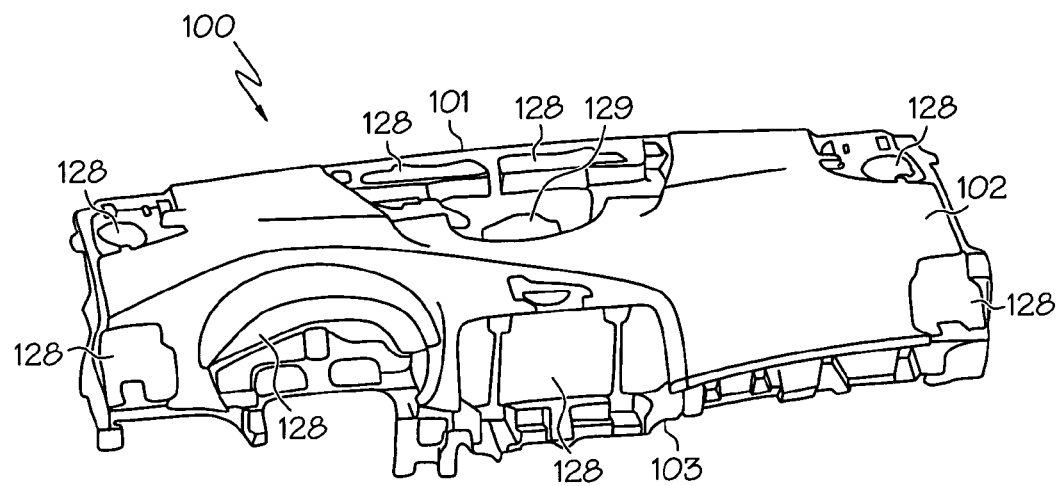
FIG. 1A is a perspective view of the top of a vehicle instrument panel in accordance with one exemplary embodiment of the present invention.
Figure 1B:
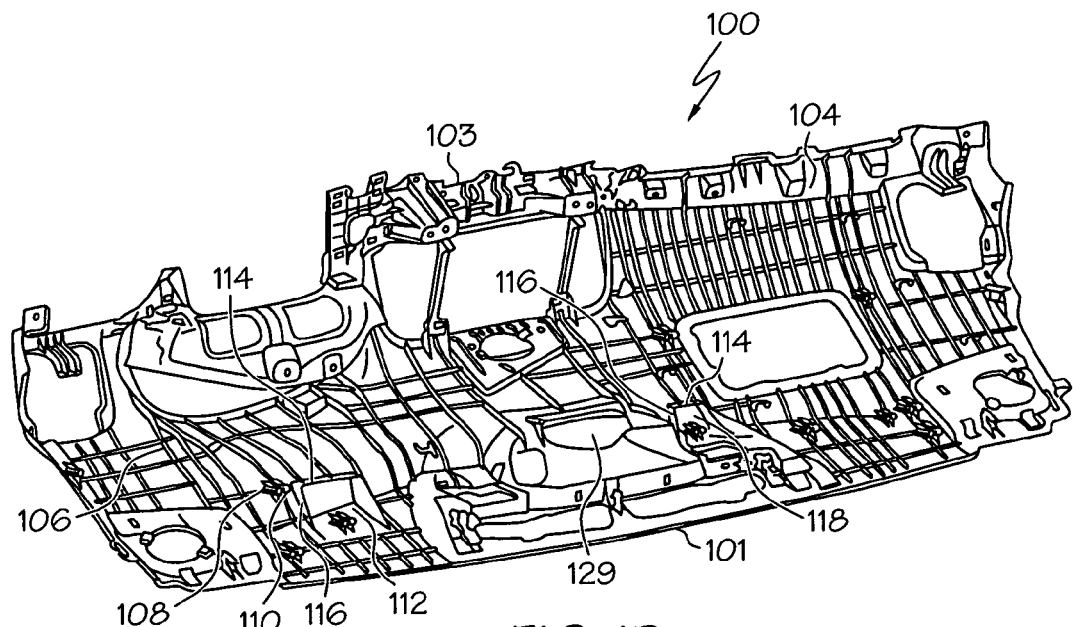
FIG. 1B is a perspective view of the bottom of a vehicle instrument panel in accordance with one exemplary embodiment shown and described herein.

FIGS. 1A and 1B show a low cost, readily recyclable vehicle instrument panel having the rigidity of a vehicle instrument panel constructed of more expensive materials. The vehicle instrument panel may generally comprise a top surface, an underside, at least one receptacle for receiving an instrument panel support and at least one instrument panel support. Each of these elements will be described more fully herein.

Referring to FIGS. 1A-1C, a vehicle instrument panel 100 may comprise metal, plastic, or composite materials. In the embodiments shown and described herein, the instrument panel 100 is formed by injection molding a polymeric material such as polypropylene. However, it should be understood that other polymeric materials and other forming processes may be used to construct the instrument panel 100 as will be apparent to one of ordinary skill in the art.

The instrument panel 100 may comprise a top surface 102, an underside 104, and a plurality of differently configured openings 128 for receiving various instruments and accessories such as dials, gages, meters, audio components, and the like. The openings 128 generally extend from the top surface 102 of the instrument panel 100 through the underside 104. It should be understood that the instrument panel 100, as described herein, may be a "soft" instrument panel such as when the top surface of the instrument panel 102 is covered with foam or other, similar material which is, in turn, covered with an instrument panel skin material. Alternatively, the instrument panel 100 may be a "hard" IP in which the instrument panel 100 is formed with a smooth top surface 102 suitable for installation in the vehicle without further aesthetic embellishment other than painting. In the embodiments of the instrument panel 100 shown and described herein, the instrument panel 100 is a "hard" instrument panel.

The underside of the instrument panel 100 may generally comprise a plurality of ribs 106, as shown in FIG. 1B. The ribs 106 are substantially orthogonal to the underside 104 of the instrument panel 100 and may extend over the underside 104 in a semi-regular, grid-like pattern generally following the contours of the instrument panel 100. The instrument panel 100 may be integrally formed with the ribs 106, such as when the instrument panel 100 and ribs 106 are injection molded as a single piece. While the ribs 106 may provide some support and rigidity to the instrument panel 100 and generally assist in maintaining the contoured shape of the instrument panel, the support provided by the ribs 106 is generally not sufficient to support heavier accessories positioned on the instrument panel 100 or to prevent the sagging of the instrument panel 100 due to heat effects and/or aging.

Still referring to FIGS. 1A and 1B, the underside of the instrument panel 100 may include plurality of bosses 108 and pins 110 extending from the underside 104. The instrument panel 100 may be integrally formed with the bosses 108 and pins 110, such as when the instrument panel, bosses 108 and pins 110 are injection molded as a single piece. Alternatively, the bosses 108 and pins 110 may be attached to the instrument panel 100 after the instrument panel 100 has been formed. The bosses 108 are generally configured with a channel to receive a screw or similar threaded fastener and serve as an attachment point for various brackets, accessories and the like. The bosses 108 may also serve as attachment points for connecting the instrument panel 100 to other structures such as the instrument panel reinforcement, the vehicle body and the like. The pins 110 serve as a registration point or datum for positioning and/or orienting an accessory or other attachment relative to the instrument panel 100. Accordingly, the bosses 108 and pins 110 work in cooperation with one another so as to facilitate the proper orientation and attachment of accessories to the underside 104 of the instrument panel 100. As such, the bosses 108 and pins 110 are generally formed as a boss/pin pair on the underside 104 of the instrument panel 100.

The underside 104 of the instrument panel 100 may also comprise one or more receptacles 112, 118. The receptacles 112, 118 are generally configured to receive an instrument panel support and secure the instrument panel support to the underside 104 of the instrument panel 100. The receptacles 112, 118, and therefore the instrument panel supports, are generally positioned on the underside 104 of an instrument panel 100 to provide support to the instrument panel 100 in areas susceptible to flexing or sagging. For example, as shown in FIG. 1B, the opening 129 in the instrument panel 100 may be configured to receive a meter, gage, or other similar accessory. The area of the instrument panel 100 surrounding the opening 129 is generally unsupported between the front edge 101 of the instrument panel 100 (where the instrument panel 100 is attached to the cowl, just below the windshield and to the rear of the engine compartment) and the rear edge 103 of the instrument panel (the edge of the instrument panel 100 closest to the driver/passenger seats where the instrument panel 100 is attached to the instrument panel reinforcement). As such, the weight of an accessory positioned in the opening 129 may cause the instrument panel 100 to sag and/or flex in the area surrounding the opening 129. The sagging and/or flexing may become more pronounced when the instrument panel 100 is exposed to heat (e.g. when the instrument panel 100 is subjected to sunlight) and/or as the instrument panel 100 ages. Accordingly, the receptacles 112, 118 and associated supports may be positioned on the underside 104 of the instrument panel 100 to support the instrument panel 100 in the area surrounding the opening 129 thereby improving the rigidity of the instrument panel 100 and preventing the instrument panel 100 from sagging and/or flexing under an applied load.

The receptacles 112, 118 may be defined by a vertical support rib 114, lateral support ribs 116, and the underside 104 of the instrument panel 100. Referring to the driver's side receptacle 112 shown in FIG. 1C by way of example, one side of the receptacle 112 is formed by a vertical support rib 114 extending from the underside 104 of the instrument panel 100. The vertical support rib 114 may be positioned on the underside 104 of the instrument panel 100 such that the support rib 114 is substantially parallel to at least a portion 104 of the underside 104 of the instrument panel 100. Lateral support ribs 116 extend from the underside 104 of the instrument panel 100 and intersect with the vertical support rib 114 forming another two sides of the receptacle 112. The lateral support ribs 116 are generally parallel to each other and orthogonal to the vertical support rib 114 at the line of intersection with the vertical support rib 114. The vertical support rib 114 and lateral support ribs 116, together, comprise a generally U-shaped configuration. The vertical support rib 114 and the lateral support ribs 116 may be integrally formed with the instrument panel 100 such as when the instrument panel 100, the vertical support rib 114 and the lateral support ribs 116 are injection molded as a single piece. In the embodiment shown in FIG. 1C, the vertical support rib 114 and lateral support ribs 116 are formed from a single, continuous rib having two right angles separating the vertical support rib 114 from the lateral support ribs 116. Alternatively, the vertical support rib 114 and each lateral support rib 116 may comprise three discrete ribs extending from the underside 104 of the instrument panel 100.

The fourth side of the receptacle 112 may comprise the underside 104 of the instrument panel 100 located in the area enclosed by the vertical support rib 114 and the lateral support ribs 116. A boss 108 and pin 110 may be disposed in the receptacles 112, 118 to facilitate securing the instrument panel support to the underside 104 of the instrument panel 100. The boss 108 and pin 110 may be integrally formed with any one of the vertical support rib 114, lateral support ribs 116, and the underside 104 of the instrument panel 100. In the embodiment shown in FIG. 1C, the boss 108 and pin 110 contained in the receptacle 112 are integrally formed with the underside 104 of the instrument panel 100.

While specific reference has been made to the driver's side receptacle 112 in describing the structure of the receptacles 112, 118, it will be understood that the passenger's side receptacle 118 may have substantially the same configuration as the driver's side receptacle 112.

Further, it should be understood that, while the receptacles 112, 118 located on the underside 104 of the instrument panel 100 are depicted herein as comprising multiple support ribs in a generally U-shaped configuration, the receptacles 112, 118 may be of any suitable geometric configuration and may comprise any number of support ribs such that the receptacles 112, 118 are suitable for receiving and securing instrument panel supports to the underside 104 of the instrument panel 100.

Referring now to FIGS. 2A-2B and FIGS. 3A-3B, the driver's side instrument panel support 130 and passenger's side instrument panel support 140 are shown. The instrument panel supports 130, 140 may comprise metal, polymeric materials, composite materials or combinations thereof. In the embodiments shown and discussed herein, the instrument panel supports 130, 140 may comprise a polymeric material of the same composition as the instrument panel 100. The instrument panel supports 130, 140 may be formed by injection molding the polymeric material as is known in the art. In order to reduce production and tooling costs, the instrument panel supports 130, 140 may be formed on the same tooling and dies used to form the instrument panel 100. However, it should be understood that other forming processes may be used to construct the instrument panel supports 130, 140 as will be apparent to one of ordinary skill in the art.

As shown in FIGS. 2A and 2B, the driver's side instrument panel support 130 may generally comprise an upper portion 131 and a lower portion 133 separated by a divider 182. The upper portion 131 and the lower portion 133 have a substantially L-shaped orientation with respect to one another such that the upper portion 131 is substantially orthogonal to the lower portion 133. The upper portion 131 may be generally box-shaped in cross section and tapered from front 135 to back 137 such that the upper portion 131 is generally wedge-shaped from front 135 to back 137. The upper portion may be generally defined by a top surface 138, sidewalls 180, 181 and the divider 182. At least a portion of the top surface 138 may comprise an upper contact surface 132 which directly contacts the underside 104 of the instrument panel 100 in the driver's side receptacle 112. The contact surface 132 may be contoured to conform to the contours of the underside 104 of the instrument panel 100 in the driver's side receptacle 112. The top surface 138 may also comprise an embossment 136 for receiving the pin/boss pair located in the driver's side receptacle 112. The embossment 138 may comprise a first hole 183 for receiving the pin of the pin/boss pair, and a second hole 184 for inserting a fastener through the embossment 136 and into the boss of the pin/boss pair.

The lower portion 133 of the driver's side support 130 may be defined between the divider 182 and the lower contact surface 134. The sides 185, 186 of the lower portion 133 extend away from the upper portion 131 such that the lower portion 133 is substantially orthogonal to the upper portion 131. The sides 185, 186 of the lower portion 131 taper between the divider 182 and the lower contact surface 134 such that the lower portion 131 is generally pyramidal in cross section. The lower portion 131 is generally tapered from front to back such that the lower portion 131 is generally wedge-shaped from front 135 to back 137. The contact surface 134 may be at an angle with respect to the divider 182 to facilitate interfacing the driver's side support 130 with an instrument panel reinforcement, as will be discussed further herein.

Figure 3A:
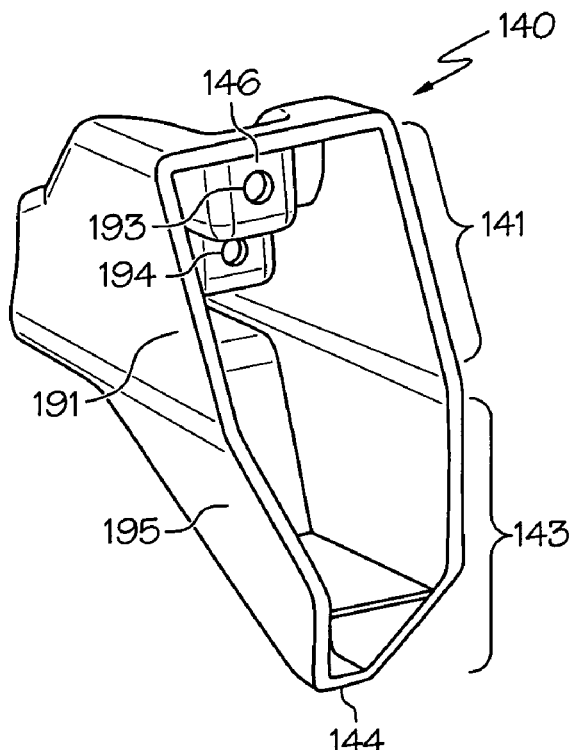
FIGS. 3A and 3B are front and back perspective views of an instrument panel support in accordance with another embodiment of the present invention.
Figure 3B:
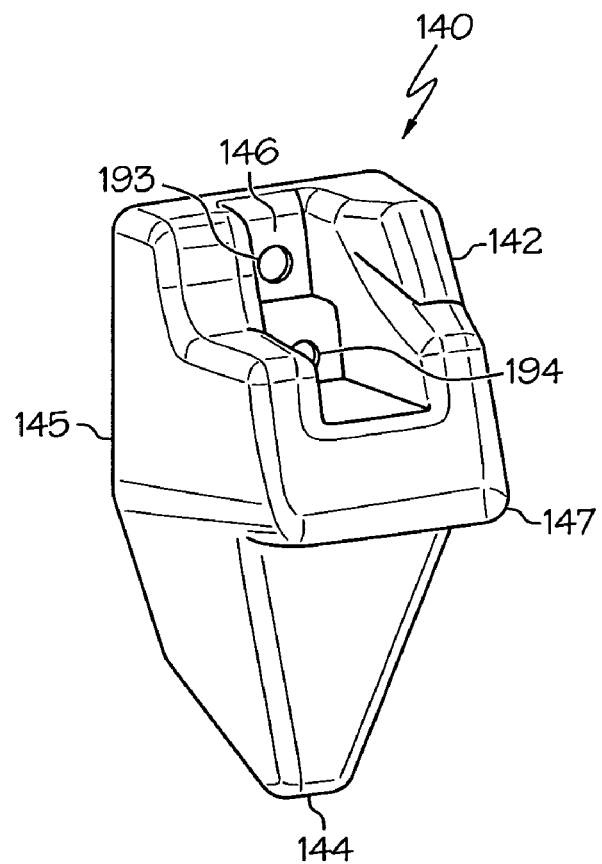

As shown in FIGS. 3A and 3B, the passenger's side instrument panel support 140 may have a similar configuration as the driver's side instrument panel support 130. The passenger's side instrument panel support 140 may comprise an upper portion 141 and a lower portion 143 in an L-shaped configuration with respect to one another such that the upper portion 141 is substantially orthogonal to the lower portion 143. A cross section of the upper portion 141 may generally have an inverted, open box-shaped configuration as defined by the top surface 148, and the sidewalls 190, 191. The upper portion 141 is tapered from front 135 to back 137 such that the upper portion 141 has a generally wedge-like configuration. A portion of the top surface 148 may be contoured to conform to the underside 104 of the instrument panel 100 in the passenger's side receptacle 118. The top surface 148 may also comprise an embossment 146 for receiving the pin/boss pair located in the passenger's side receptacle 118. The embossment 146 may comprise a first hole 193 for receiving the pin of the pin/boss pair and a second hole 194 for receiving a fastener inserted through the embossment 146 and into the boss of the pin/boss pair located in the passenger's side receptacle 118.

The lower portion 143 of the passenger's side instrument panel support 140 may be generally pyramidal in shape with the sides 195, 196 of the lower portion 143 tapering between the upper portion 141 and the lower contact surface 144. The sides 195, 196 of the lower portion 143 generally extend away from the upper portion 141 such that the lower portion 143 is substantially orthogonal to the upper portion 141. The lower portion 143 may be tapered from front 145 to back 147 such that the lower portion 143 is generally wedge-shaped.

The driver's side instrument panel support 130 and passenger's side instrument panel supports 140 shown and described herein are shaped to support a specific area of a specific instrument panel 100. Because instrument panels for different vehicles may have different shapes and configurations, it should be understood that the instrument panel supports used in conjunction with such instrument panels may also have different shapes and configurations. Accordingly, it should be understood that the instrument panel supports may be of any shape and/or configuration as may be suitable for supporting an instrument panel on an instrument panel reinforcement as described herein.

Figure 4A:
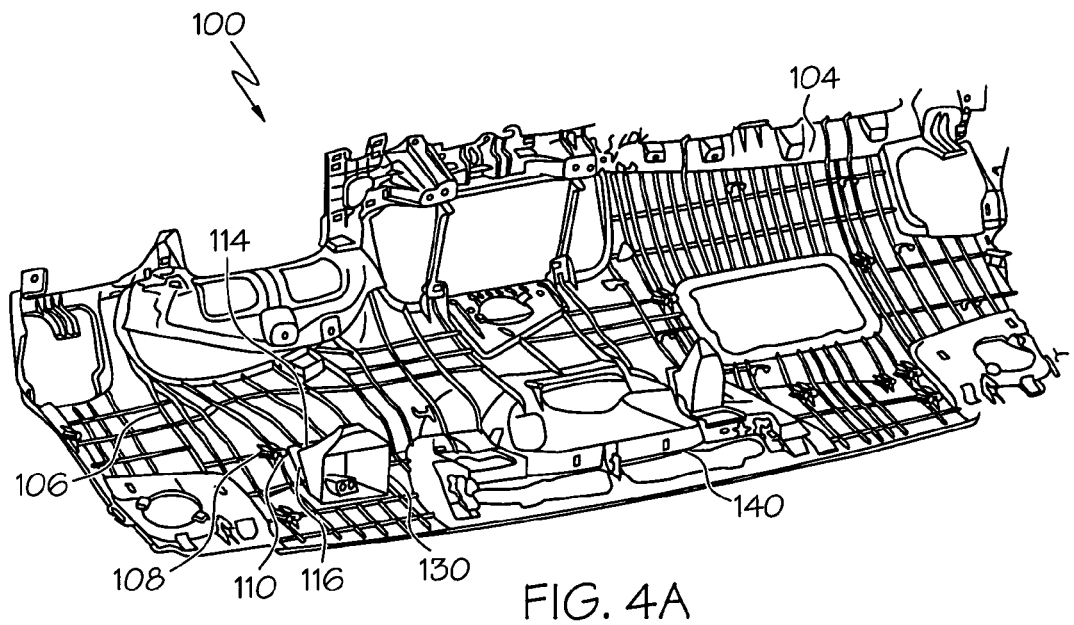
FIG. 4A is a perspective view of the underside of an instrument panel in accordance with one embodiment of the present invention wherein instrument panel supports are positioned in receptacles located on the underside of the instrument panel.
Figure 4B:
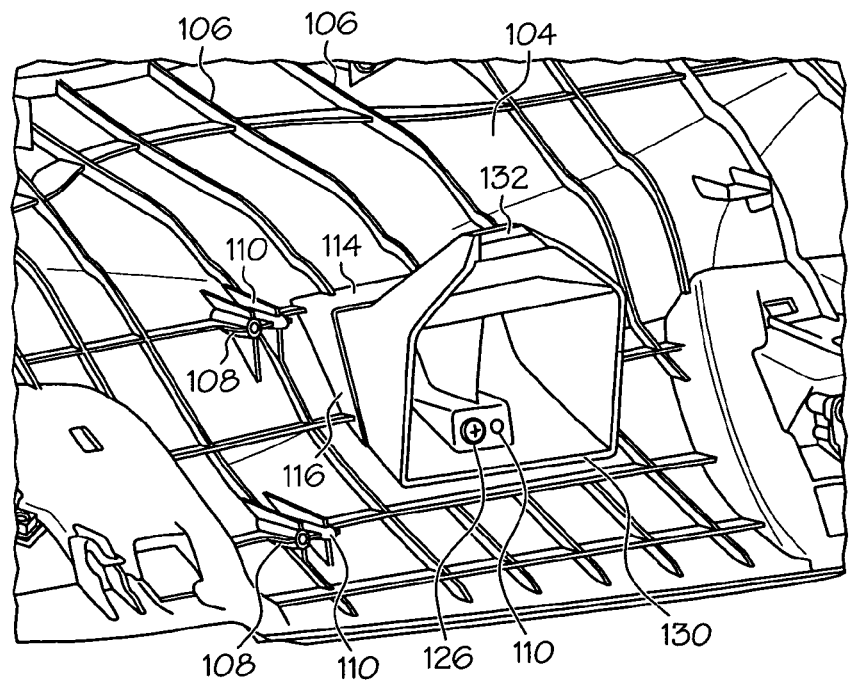
FIG. 4B is a close up view of the underside of an instrument panel in accordance with one embodiment of the present invention wherein an instrument panel support is positioned in a receptacle located on the underside of the instrument panel.

Referring now to FIGS. 4A and 4B, the underside 104 of the instrument panel 100 is shown with instrument panel supports 130, 140 positioned in the receptacles 112, 118. Referring to the driver's side instrument panel support 130 and the driver's side receptacle 112 by way of example, the instrument panel support 130 may be attached to the underside 104 of the instrument panel 100 by inserting the upper portion 131 of the instrument panel support 130 into the receptacle 112 such that the boss 108 and pin 110 positioned in the receptacle 112 are aligned with the corresponding holes 183, 184 in the embossment 136 of the instrument panel support 130. The pin 110 positioned in the receptacle 112 is received in the corresponding hole 183 in the embossment 136 of the instrument panel support 130 thereby ensuring that the instrument panel support 130 is properly positioned in the receptacle 112. The pin 110 may also align the boss 108 with the corresponding hole 184 in the embossment 136. With the instrument panel support 130 properly oriented in the receptacle 112, a fastener 126, such as a screw, bolt or other suitable fastener, may be inserted through the hole 184 in the embossment 136 of the instrument panel support 130 and into the boss 108 thereby affixing the instrument panel support 130 to the underside 104 of the instrument panel 100. With the upper portion 131 of the instrument panel support 130 positioned in the receptacle 112, the lower portion 133 of the instrument panel support 130 extends substantially perpendicular to and away from the underside 104 of the instrument panel 100. It should be understood that the passenger's side instrument panel support 140 may be affixed to the underside 104 of the instrument panel 100 by inserting the instrument panel support 140 in the receptacle 118 in the same manner.

When the instrument panel supports 130, 140 are inserted into the receptacles 112, 118 on the underside 104 of the instrument panel 100, the upper contact surface 132, 142 of each instrument panel support 130, 140 is in direct contact with the underside 104 of the instrument panel 100. Referring to the cross sectional view of the driver's side instrument panel support 130 attached to the underside 104 of an instrument panel 100 shown in FIG. 7 by way of example, the upper contact surface 132 of the instrument panel support 130 is contoured to correspond to the contours of the underside 104 of the instrument panel 100 such that, when the instrument panel support 130 is inserted into the receptacle 112, there is zero clearance between the underside 104 of the instrument panel 100 and the upper contact surface 132 of the instrument panel support 130. This arrangement facilitates the transfer of loads applied to the top surface 102 of the instrument panel 100 to the instrument panel support 130 without the instrument panel 100 flexing or elastically deforming under the applied load. Accordingly, this arrangement provides the instrument panel 100 with maximum rigidity in the vertical direction. The vertical support rib 114 of the receptacle 112 firmly holds the instrument panel support 130 against the underside 104 of the instrument panel 100 thereby maintaining the zero clearance between the underside 104 of the instrument panel 100 and the upper contact surface 132 of the instrument panel support 130. The lateral support ribs 116 maintain the orientation of the instrument panel support 130 in the lateral direction. While FIG. 7 depicts the driver's side instrument panel support 130 in contact with the underside 104 of the instrument panel 100, it should be understood that the passenger's side instrument panel support 140 is similarly situated with respect to the underside 104 of the instrument panel 100 when the passenger's side instrument panel support 140 is inserted into the corresponding receptacle 118.

Figure 5:
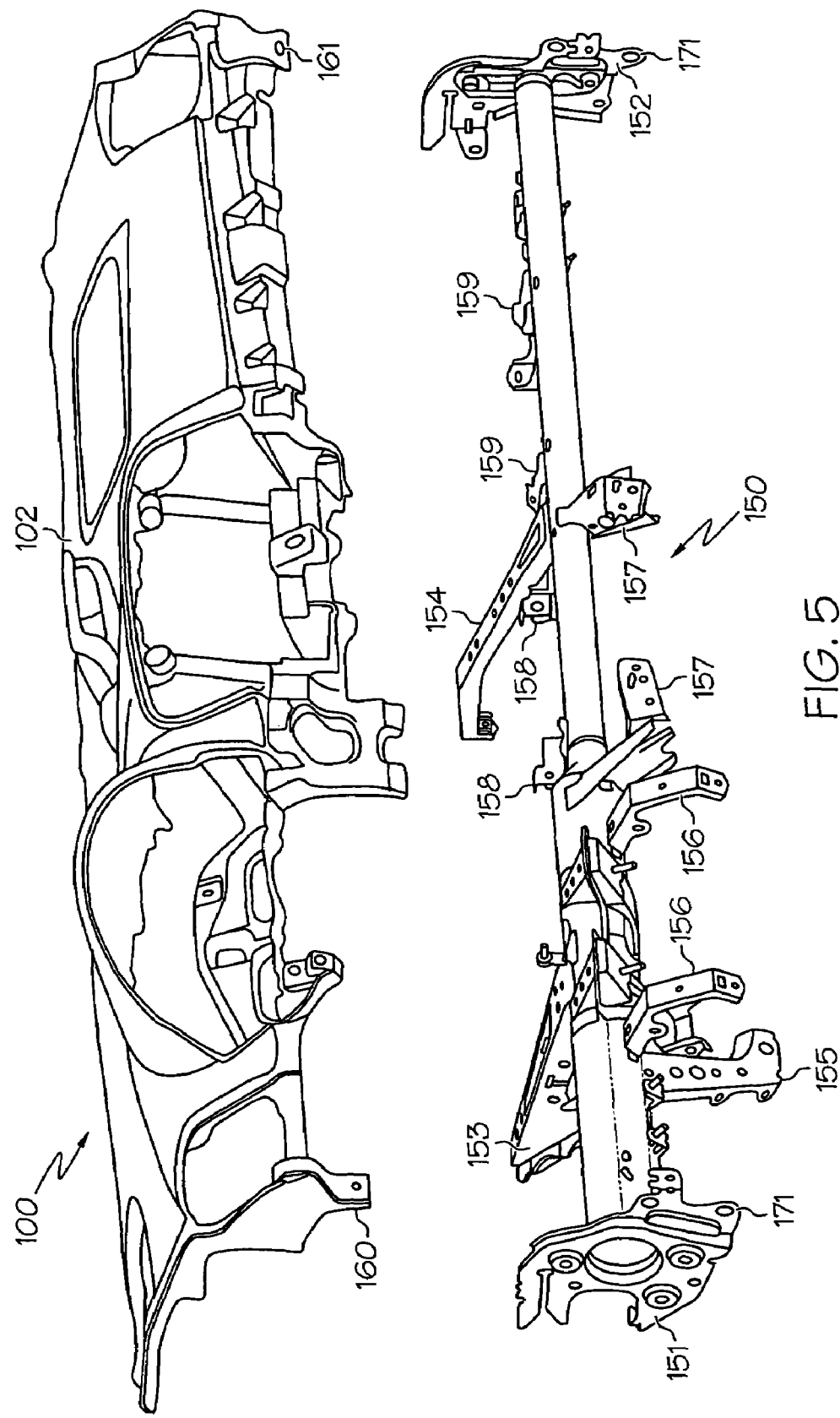
FIG. 5 is a perspective view of an instrument panel in accordance with one embodiment of the present invention being assembled on to an instrument panel reinforcement.

With the instrument panel supports 130, 140 positioned in their respective receptacles 112, 118, the instrument panel 100 may be assembled on to an instrument panel reinforcement (IPR) 150 as shown in FIGS. 5-8. The instrument panel 100 and the IPR 150, together, form the instrument panel module which, in turn, may be installed in a vehicle in front of the driver's and passenger's seats. As shown in FIG. 5, the IPR 150 is a tubular metal structure which may be directly attached to the vehicle body through driver's side and passenger's side attachment brackets 151, 152. The IPR 150 comprises a plurality of brackets for supporting various accessories, components and structural members positioned in the instrument panel 100. Such brackets may include, among others, energy absorbing (EA) support brackets 156, the steering column support bracket 153, HVAC support brackets 158, the cowl support bracket 154 and passenger airbag support brackets 159. The IPR 150 is generally located below the instrument panel 100 and supports both the instrument panel 100 and the various accessories located in the instrument panel 100.

Before the instrument panel 100 is installed on the IPR 150, felt pads 124 may be attached to the lower contact surfaces 134, 144 of the instrument panel supports 130, 140. The felt pads 124 insulate the instrument panel supports 130, 140 from vibrations that may be transmitted to the instrument panel supports 130, 140 when the instrument panel supports 130, 140 are brought in to contact with other surfaces thereby eliminating unwanted noise and vibrations.

Figure 6:
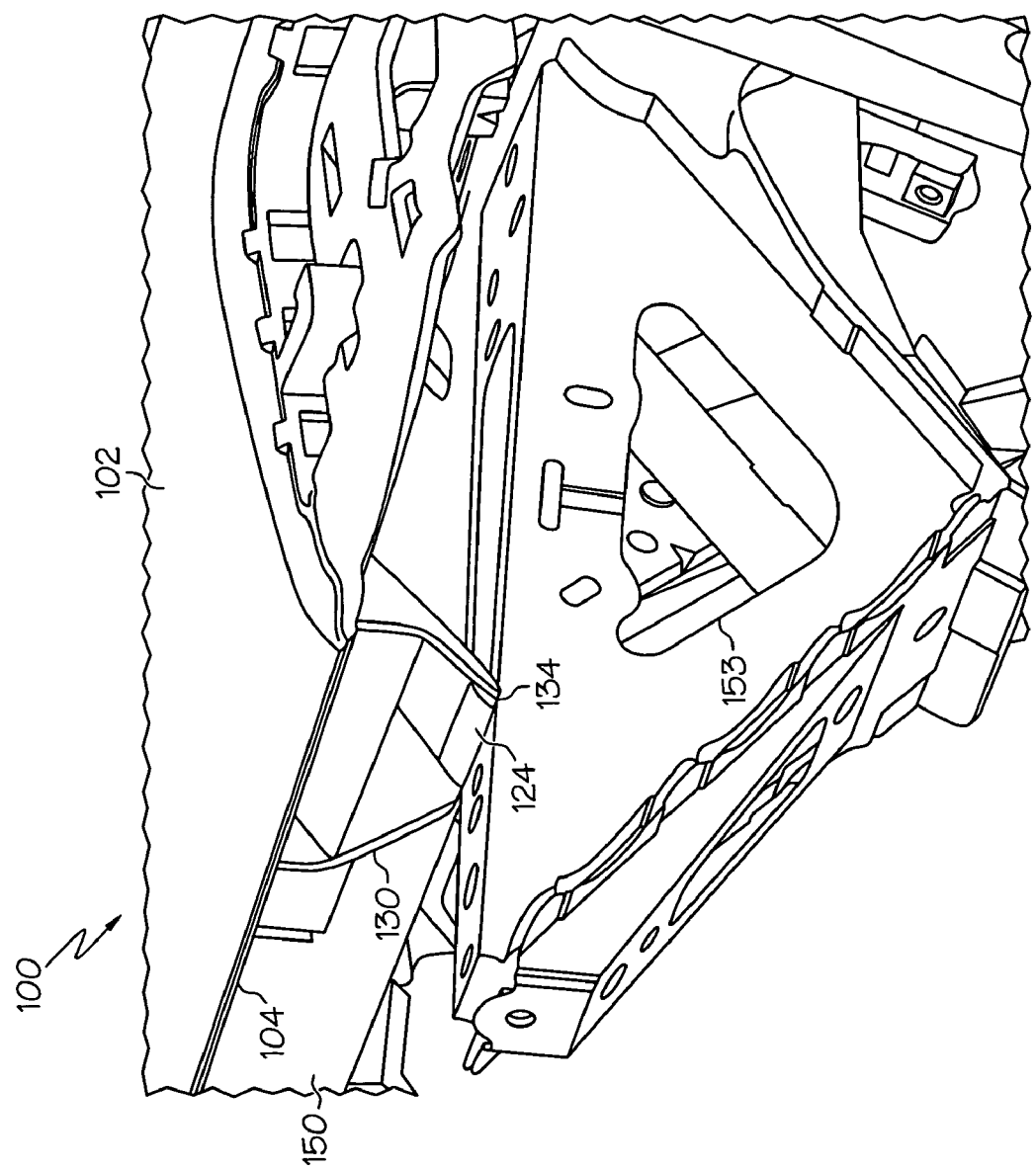
FIG. 6 is a close up view of an instrument panel support in accordance with one embodiment of the present invention resting on a bracket attached to an instrument panel reinforcement.
Figure 7:
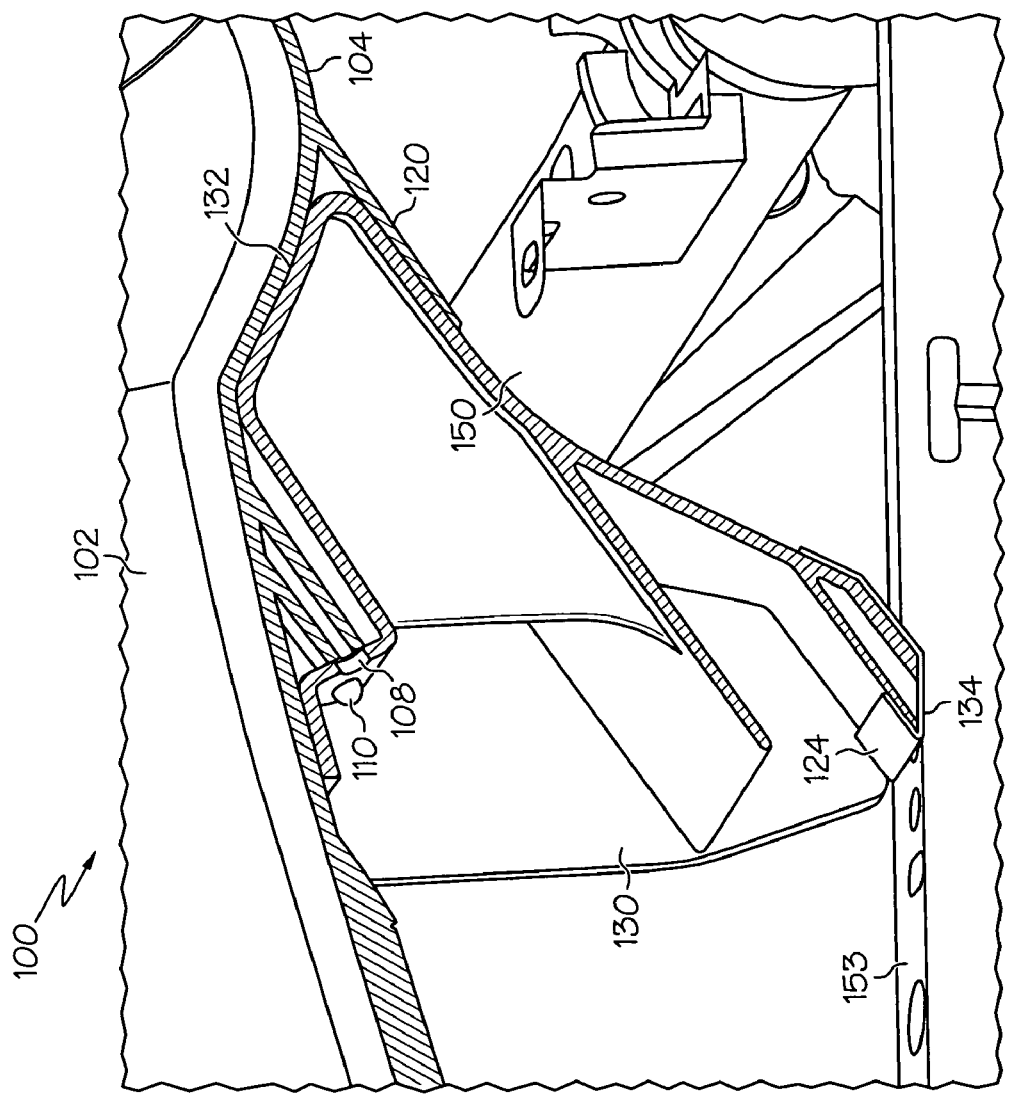
FIG. 7 is a cross sectional view of instrument panel support in accordance with one embodiment of the present invention resting on a bracket attached to an instrument panel reinforcement.
Figure 8:
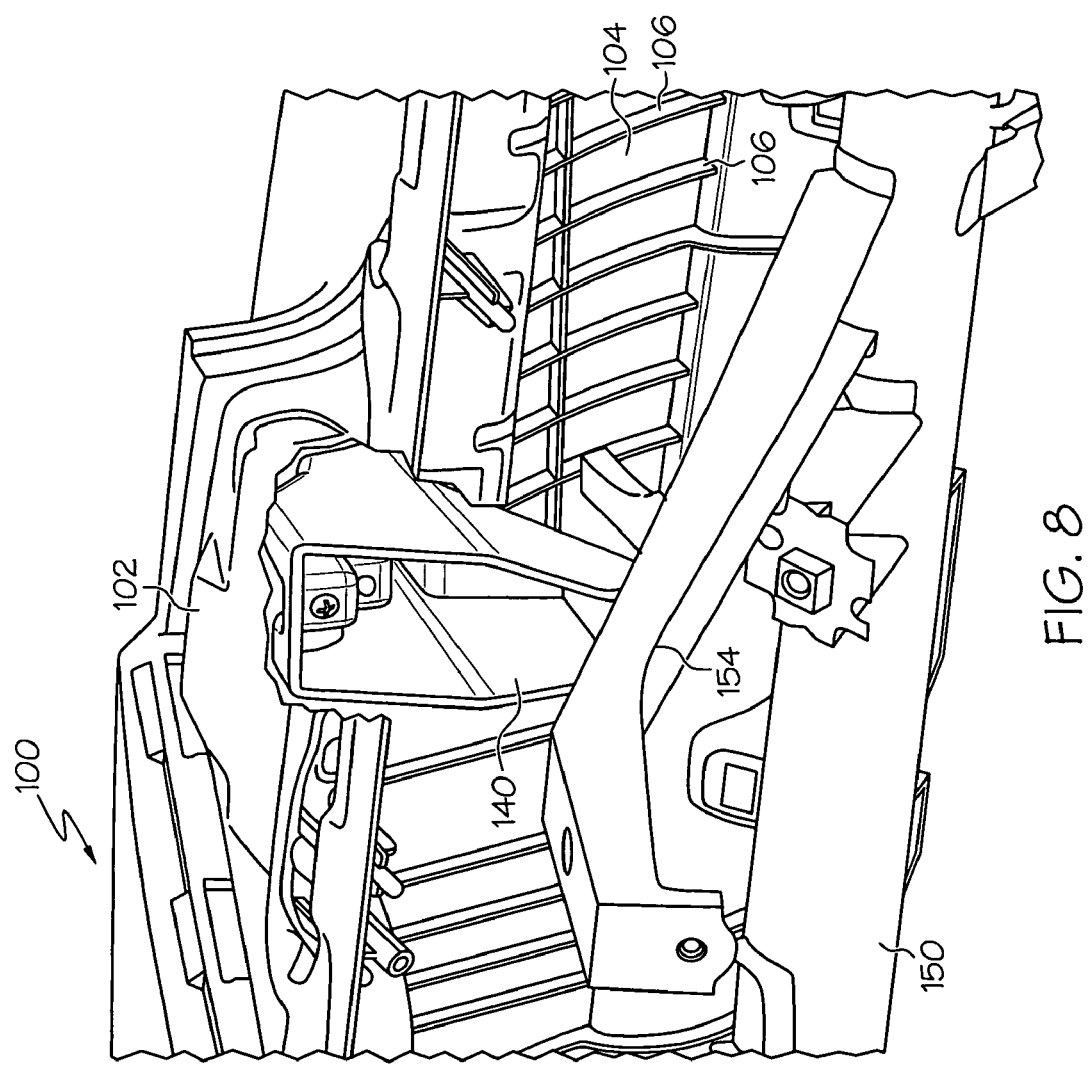
FIG. 8 is a close up view of an instrument panel support in accordance with another embodiment of the present invention resting on a bracket attached to an instrument panel reinforcement.

When the instrument panel 100 is assembled on to the IPR 150, the lower contact surface 134 of the driver's side instrument panel support 130 rests on the steering column support bracket 153 of the IPR 150 such that the felt pad 124 is disposed between the lower contact surface 134 and the steering column support bracket 153, as shown in FIGS. 6-7. As discussed herein, the lower contact surface 134 of the driver's side instrument panel support 130 is angled to correspond to the angle of the steering column support bracket 153 such that the contact surface 134 is flush with the steering column support bracket 153. Similarly, the lower contact surface 144 of the passenger's side instrument panel support 130 rests on the cowl support bracket 154 of the IPR 150 such that the felt pad 124 is disposed between the lower contact surface 144 and the cowl support bracket 154, as shown in FIG. 8. The instrument panel 100 is then attached to the IPR 150 by driving bolts or other suitable connectors through the attachment points 160, 161 and into the corresponding threaded holes 170, 171 located on the IPR 150.

When the instrument panel 100 is attached to the IPR 150 with the instrument panel supports 130, 140 disposed there between, the instrument panel supports 130, 140 provide support to the instrument panel 100 in the vertical direction. As such, loads applied to the surface 102 of the instrument panel 100 are directly transmitted to the IPR 150 via the instrument panel supports 130, 140. Because the IPR 150 is a completely rigid metal part and because the instrument panel supports 130, 140 are disposed between the IPR 150 and the underside 104 of the instrument panel 100 with zero clearance, loads applied to the surface 102 of the instrument panel 100 are transmitted to the IPR 150 without the instrument panel 100, sagging, flexing or otherwise elastically deforming under the load. Accordingly, the instrument panel supports 130, 140 inserted in the receptacles 112, 118 on the underside 104 of the instrument panel 100 provide a more rigid instrument panel 100 capable of supporting heavier accessories. Further, the additional vertical reinforcement provided by the instrument panel supports 130, 140 to the instrument panel 100 reduces or eliminates sagging of the instrument panel 100 due to the effects of heat and/or aging.

It should now be understood that the vehicle instrument panel and associated instrument panel supports described herein provide a vehicle instrument panel with improved rigidity. The instrument panel and instrument panel supports disclosed herein may be used in conjunction with instrument panels constructed of various materials including plastics, metals, composite materials and the like. However, the instrument panel and instrument panel support as disclosed herein are particularly well suited for use in conjunction with instrument panels constructed of materials having low rigidity, such as polypropylene. Constructing and supporting a polypropylene instrument panel in the manner described herein provides a readily recyclable, low cost instrument panel with the rigidity of a more expensive instrument panel such as those constructed of more expensive materials such as ABS.

While particular embodiments and aspects of the present invention have been illustrated and described, various other changes and modifications can be made without departing from the spirit and scope of the invention. Moreover, although various inventive aspects have been described, such aspects need not be utilized in combination. It is therefore intended that the appended claim to cover all such changes and modifications that are within the scope of this invention.

What is claimed is:

1. An instrument panel for a vehicle comprising:
   a top surface;
   an underside positioned opposite the top surface of the instrument panel, the underside having at least one receptacle, wherein the at least one receptacle is defined by at least one rib extending from the underside of the of the instrument panel and comprises a boss and pin; and
   at least one instrument panel support for supporting the instrument panel in the vertical direction, wherein the at least one instrument panel support comprises an upper contact surface for contacting the underside of the instrument panel, a lower contact surface for contacting an instrument panel reinforcement, at least one sidewall connecting the upper contact surface with the lower contact surface and an embossment for receiving the boss and the pin;
   wherein the at least one instrument panel support is slidably engaged with the at least one receptacle on the underside of the instrument panel such that the upper contact surface of the at least one instrument panel support is in direct contact with the underside of the instrument panel.

2. The instrument panel of claim 1 wherein the at least one receptacle and the corresponding instrument panel support are positioned on the underside of the instrument panel in areas of the instrument panel adjacent to openings in the instrument panel.

3. The instrument panel of claim 1 wherein the receptacle is defined by a vertical support rib extending form the underside of the instrument panel, two lateral support ribs extending from the underside of the instrument panel.

4. The instrument panel of claim 3 wherein the vertical support rib is substantially parallel to at least a portion of the underside of the instrument panel defining the receptacle.

5. The instrument panel of claim 1 wherein the instrument panel comprises a plurality of receptacles and instrument panel supports.

6. The instrument panel of claim 1 wherein the at least one instrument panel support comprises an upper portion and a lower portion substantially orthogonal to one another, wherein the upper portion of the at least one instrument panel support comprises the upper contact surface and the lower portion of the at least one instrument panel support comprises the lower contact surface.

7. The instrument panel of claim 1 wherein the upper contact surface of the instrument panel support is contoured to follow the contours of the underside of the instrument panel.

8. The instrument panel of claim 1 wherein, when the instrument panel is assembled on to an instrument panel reinforcement, the at least one instrument panel support is disposed between the instrument panel and the instrument panel reinforcement and the lower contact surface of the at least one instrument panel support rests on at least a portion of the instrument panel reinforcement.

9. An instrument panel module for a vehicle comprising:
   an instrument panel comprising:
   a top surface;
   an underside positioned opposite the top surface of the instrument panel, the underside having a plurality of receptacles, wherein the plurality of receptacles are defined by a vertical support rib and a plurality of lateral support ribs extending from the underside of the of the instrument panel; and
   a plurality of instrument panel supports for supporting the instrument panel in vertical and lateral directions, wherein the plurality of instrument panel supports comprise an upper contact surface for contacting the underside of the instrument panel, a lower contact surface for contacting an instrument panel reinforcement and at least one sidewall connecting the upper contact surface with the lower contact surface;
   wherein the plurality of instrument panel supports are slidably engaged with the plurality of receptacles on the underside of the instrument panel such that the upper contact surfaces of the plurality of instrument panel supports are in direct contact with the underside of the instrument panel; and
   an instrument panel reinforcement comprising a plurality of support brackets;
   wherein the instrument panel is installed on the instrument panel reinforcement such that the plurality of instrument panel supports is are disposed between the instrument panel and the instrument panel reinforcement and the lower contact surfaces of the plurality of instrument panel supports are resting on a portion of the instrument panel reinforcement.

10. The instrument panel module of claim 9 wherein the receptacles and the corresponding instrument panel supports are positioned on the underside of the instrument panel in areas of the instrument panel adjacent to openings in the instrument panel.

11. The instrument panel module of claim 9 wherein, when the instrument panel is positioned on the instrument panel reinforcement, the lower contact surfaces of the instrument panel supports rest on a bracket of the instrument panel reinforcement.

12. The instrument panel module of claim 9 wherein the receptacles comprise a boss and a pin positioned on the underside of the instrument panel and the upper contact surfaces of the instrument panel supports comprise an embossment configured to receive the boss and the pin.

13. The instrument panel module of claim 9 wherein the vertical support rib is substantially parallel to at least a portion of the underside of the instrument panel defining the receptacles such that, when the instrument panel supports are positioned in the receptacles, the vertical support rib holds the upper portion of the instrument panel supports to the underside of the instrument panel.

14. The instrument panel module of claim 9 wherein the upper contact surfaces of the instrument panel supports are contoured to follow the contours of the underside of the instrument panel.

15. A method of assembling a vehicle instrument panel module comprising:
   providing a vehicle instrument panel comprising:
   a top surface;
   an underside positioned opposite the top surface of the instrument panel, the underside having a plurality of receptacles, wherein the plurality of receptacles are defined by a vertical support rib and a plurality of lateral support ribs extending from the underside of the of the instrument panel; and providing a plurality of instrument panel supports for supporting the instrument panel in vertical and lateral directions, wherein the plurality of instrument panel supports comprise an upper contact surface for contacting the underside of the instrument panel, a lower contact surface for contacting an instrument panel reinforcement and at least one sidewall connecting the upper contact surface with the lower contact surface;

providing an instrument panel reinforcement comprising a plurality of support brackets;

inserting the plurality of instrument panel supports into the plurality of receptacles on the underside of the instrument panel such that the upper contact surface of the plurality of instrument panel supports contacts the underside of the instrument panel;

positioning the instrument panel on the instrument panel reinforcement such that the instrument panel supports are disposed between the instrument panel and the instrument panel reinforcement and the lower contact surfaces of the instrument panel supports rests on at least a portion of the instrument panel reinforcement.

16. The method of assembling a vehicle instrument panel module of claim 15 wherein the receptacles and the corresponding instrument panel supports are positioned on the underside of the instrument panel in areas of the instrument panel adjacent to openings in the instrument panel.

17. The method of assembling a vehicle instrument panel module of claim 15 wherein the receptacles comprise a boss and a pin positioned on the underside of the instrument panel and the upper contact surface of the instrument panel supports comprise an embossment configured to receive the boss and the pin.

18. The method of assembling a vehicle instrument panel module of claim 15 wherein the vertical support rib is substantially parallel to at least a portion of the underside of the instrument panel defining the receptacles and the instrument panel supports comprises an upper portion and a lower portion substantially orthogonal to one another, wherein the upper portion of the instrument panel supports comprise the upper contact surface and the lower portion of the instrument panel supports comprise the lower contact surface and, when the instrument panel supports are positioned in the receptacles, the vertical support rib holds the upper portion of the instrument panel supports to the underside of the instrument panel.

* * * * *